Aug. 15, 1950
L. E. TOMLINSON
2,518,578
HYDRAULIC PUMP AND MOTOR TRANSMISSION
WITH MOTOR DISPLACEMENT RESPONSIVE
TO MOTOR SPEED AND FLUID PRESSURE
Filed Aug. 15, 1946
4 Sheets—Sheet 1
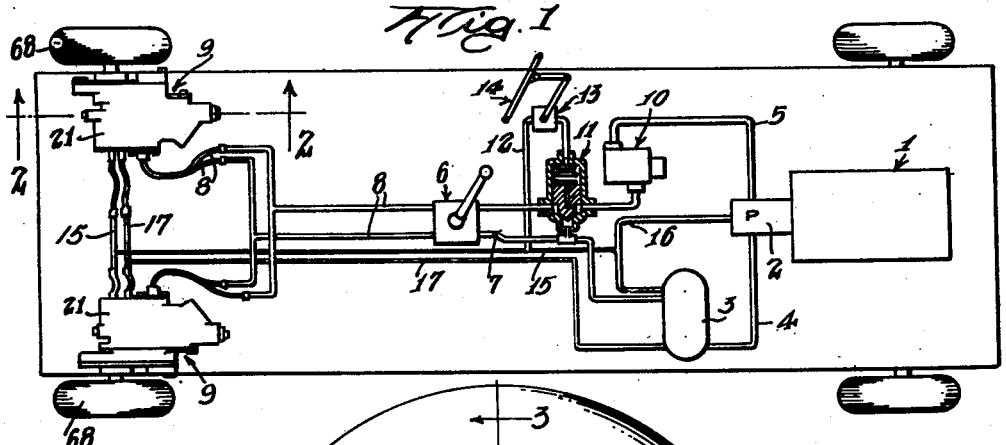
Inventor
Lloyd E. Tomlinson
By Lyon & Lyon
Attorneys Aug. 15, 1950

L. E. TOMLINSON 2,518,578

HYDRAULIC PUMP AND MOTOR TRANSMISSION
WITH MOTOR DISPLACEMENT RESPONSIVE
TO MOTOR SPEED AND FLUID PRESSURE

Filed Aug. 15, 1946

Inventor
Lloyd E. Tomlinson
Lyon & Lyon
By Attorneys

Aug. 15, 1950
L. E. TOMLINSON
2,518,578
HYDRAULIC PUMP AND MOTOR TRANSMISSION
WITH MOTOR DISPLACEMENT RESPONSIVE
TO MOTOR SPEED AND FLUID PRESSURE
Filed Aug. 15, 1946
4 Sheets-Sheet 3
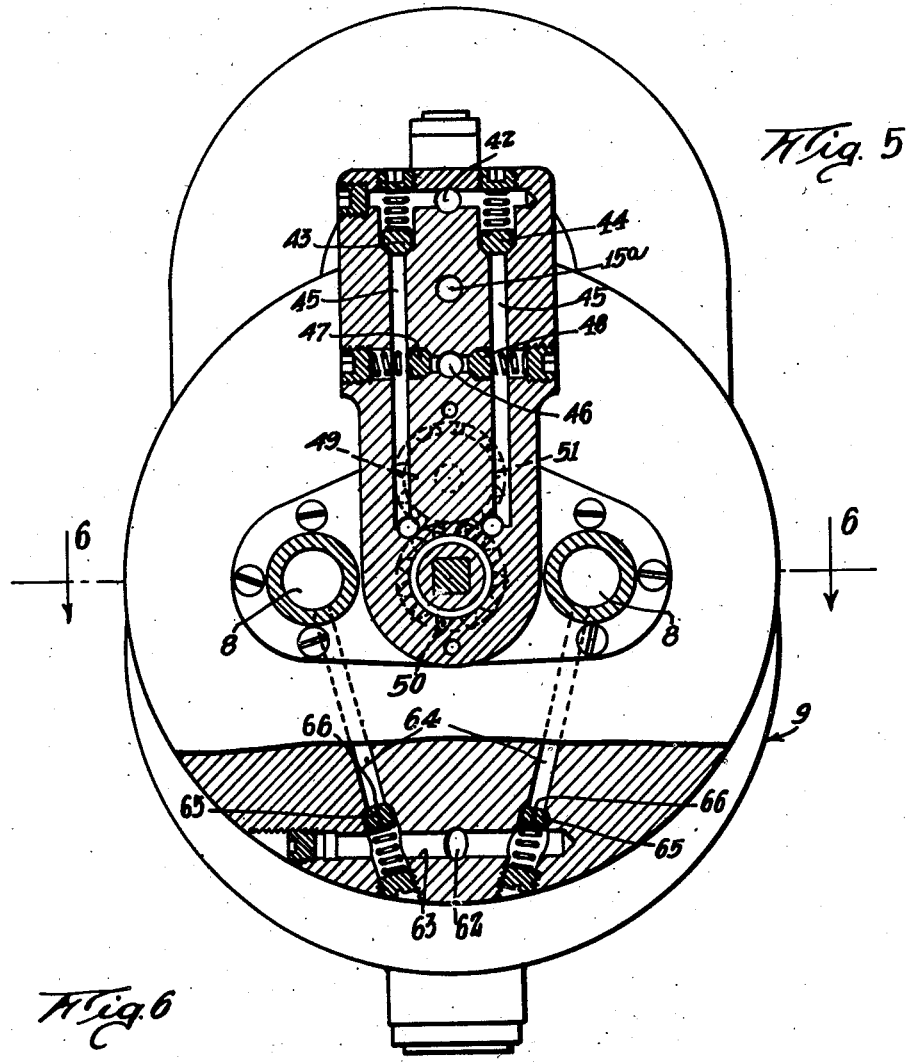
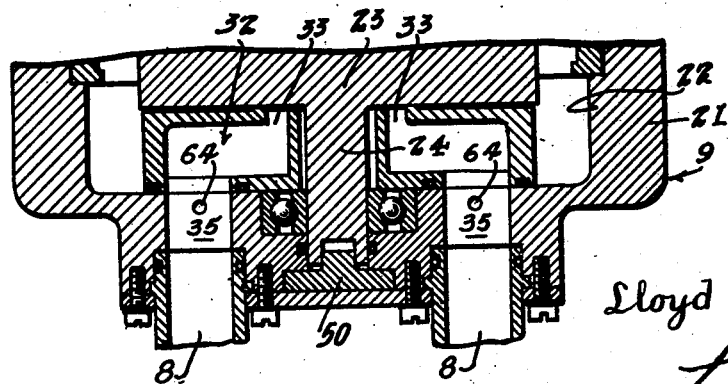
Inventor
Lloyd E. Tomlinson
By Lyon & Lyon
Attorneys Patented Aug. 15, 1950

2,518,578

UNITED STATES PATENT OFFICE 2,518,578

HYDRAULIC PUMP AND MOTOR TRANSMISSION WITH MOTOR DISPLACEMENT RESPONSIVE TO MOTOR SPEED AND FLUID PRESSURE

Lloyd E. Tomlinson, Los Angeles, Calif., assignor to Hydro-Aire, Incorporated, Los Angeles, Calif., a corporation of California Application August 15, 1946, Serial No. 690,728

6 Claims. (Cl. 60—53)

1

My invention relates to automatic transmissions, more particularly to transmissions for automobiles and other vehicles. Included in the objects of my inventions are:

First, to provide an automatic transmission wherein an internal combustion engine or other prime mover drives a fluid pressure generator, which drives one or more fluid motors mechanically connected to the wheels of a vehicle.

Second, to provide an hydraulic automatic transmission of this type wherein the effective speed ratio between the vehicle drive wheels and the internal combustion engine automatically changes as the velocity of the vehicle changes; that is, at low velocity the speed of the engine is high with respect to the wheel speed and the applied torque is high, whereas at high velocity, the speed of the engine is low with respect to the wheel speed and the applied torque is correspondingly lower, such changes in speed ratio between the engine and the drive wheels being accomplished progressively and automatically.

Third, to provide a hydraulic automatic transmission which provides within a preselected minimum and maximum limit an infinite number of speed ratios between the internal combustion engine and drive wheels, and which requires for speed control of a vehicle by the driver merely the operation of the accelerator to vary the engine speed; thereby providing a drive means for automobiles which has virtually the flexibility of a steam engine drive.

Fourth, to provide a hydraulic automatic transmission which does not require appreciable by-passing of pressure fluid in order to operate at low speeds or to effect change in speeds, and which under all conditions of operation utilizes substantially the full efficiency of the fluid pressure generator and motors.

Fifth, to provide a hydraulic automatic transmission wherein speed ratio control is accomplished within or as a part of the fluid motor which is connected to the drive wheels of the vehicle, the fluid motor incorporating a novel means whereby its capacity is caused to vary automatically with its speed and with the pressure of the power fluid.

Sixth, to provide a hydraulic motor and control means therefor which is inherently simple in construction notwithstanding the fact that complete automatic speed ratio control is accomplished.

2

With the above and other objects in view as may appear hereinafter, reference is directed to the accompanying drawings, in which:

Figure 1 is a diagrammatical plan view of a vehicle incorporating my automatic transmission.

Figure 2 is an enlarged sectional view of one of the fluid motors taken through 2—2 of Figure 1, showing the motor in its starting or high torque position.

Figure 5 is a partial elevational partial sectional view thereof taken along the line 5—5 of Figure 3.

Figure 6 is a fragmentary sectional view taken through 6—6 of Figure 5.

Figure 3:
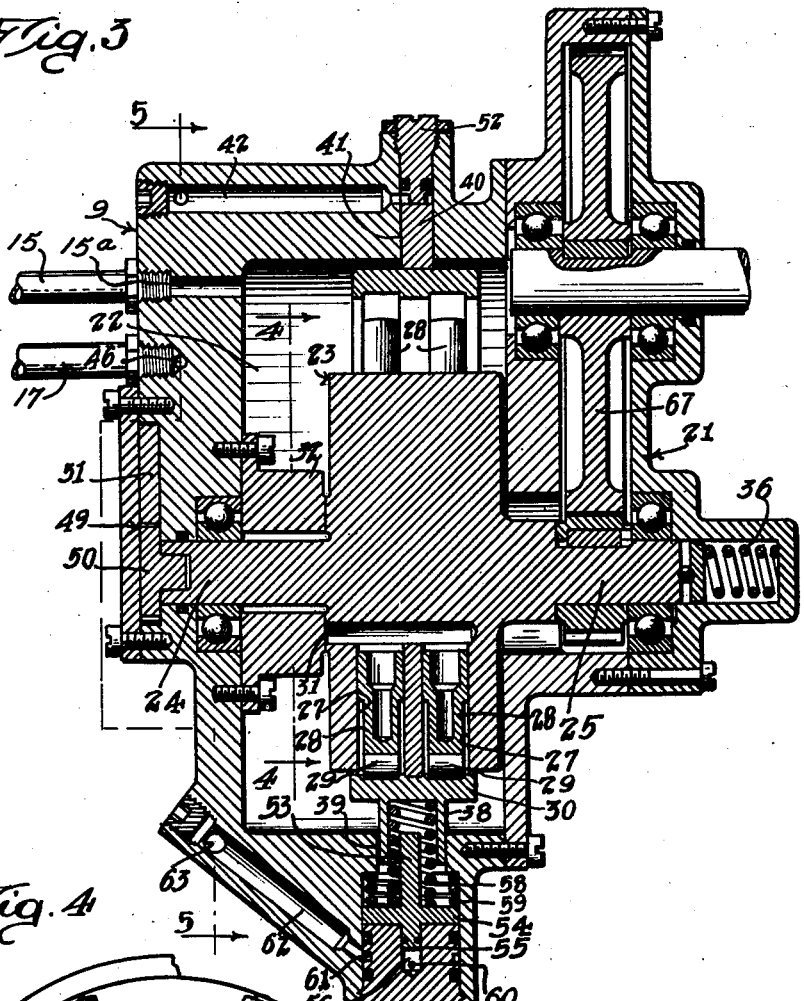
Figure 3 is a sectional view thereof taken through 3—3 of Figure 2.
Figure 4:
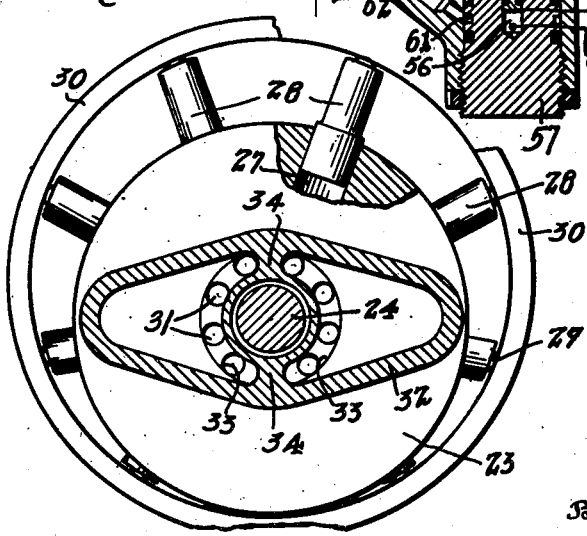
Figure 4 is a fragmentary sectional view thereof taken through 4—4 of Figure 3.

In the accompanying drawings my automobile transmission is shown as adapted to the operation of an automobile. An internal combustion engine 1 drives a fluid pump 2, the pump receives fluid from a reservoir 3 through an intake line 4 and discharges into a line 5. The line 5 is connected to a reversing valve 6 to which is also connected a return line 7 communicating with the reservoir 3. The reversing valve 6 is connected to two motor lines 8 in such a manner that either line may serve as the supply or a return line. The motor lines 8 branch and are connected to fluid motor units 9 through suitable flexible connections.

The discharge line 5 and return line 7 are connected by a relief valve 10 designed to prevent the pressure in the discharge line 5 from exceeding a predetermined value. The discharge line 5 and return line 7 are also connected together by an unloader valve 11 so arranged that it may be opened when it is desired to disconnect the engine from the motor units 9. The unloader valve may be controlled through a bleeder line 12 and bleeder valve 13 operated by the throttle pedal 14 so that when the foot is removed from the throttle pedal the unloader valve 11 will be opened to short circuit the pump 2. The bleeder line 12 joins a drain line 15 extending from the motor units 9 and having a branch 16 connected with the pump 2. The drain lines 15 and 16 communicate with the reservoir 3. Also connected with the reservoir 3 is a control pump supply line 17 which leads to each of the motor units 9 for a purpose which will be described hereinafter.

Each motor unit 9 includes a motor case 21 which defines a motor chamber 22. Contained within the motor chamber 22 is a rotor 23 having shafts 24 and 25 suitably supported in bearings journaled in the ends of the motor case 21. The rotor is provided with a plurality of radially directed cylinders 27 which receive pistons 28. Rollers 29 are provided on the radialy outer extremities of the pistons 28 and engage a cylindrical stator ring 30. The radially inner ends of the cylinders 27 are connected to axially directed passages 31. These intersect one end of the rotor 23 and are covered by a valve block 32 suitably mounted within the motor chamber 22. The valve block is provided with arcuate ports 33 adapted to uncover the passages 31 in a manner to permit intake and discharge of fluid. The ports 33 are separated by webs 34. Passages 35 communicate with the valve block 32 and with the lines 8. In order to maintain sealing connections between the rotor 23 and the valve block 32 a spring 36 may exert an end force on the shaft 25 or hydraulic pressure may be used for this purpose.

The stator ring 30 is guided between walls 37 of the motor chamber 22 and is retained against rotation by a torque stem 38 which is reciprocable within a guide opening 39 provided in the motor case.

It should be observed that while a particular fluid motor structure has been described the motor itself may be considered as conventional except in so far as it relates to my control means to be described hereinafter; that is, for purposes of illustration one substantially conventional type of variable capacity motor has been described, whereas in fact virtually any of the various variable capacity fluid motors may be adapted to my purposes; for example, the wobble plate type or the type employing crank shaft, connecting rods and radially directed pistons.

Irrespective of the type of variable capacity fluid motor employed, there is inherent in such motor an element capable of being moved in a manner to regulate the capacity of the motor. In the present instance, movement of the stator ring 30 in a plane transverse to the axis of the rotor regulates or controls the effective capacity of the motor. When the stator ring 30 is in its most eccentric position, the capacity of the motor is greatest, whereas when the ring approaches a concentric position the capacity of the motor approaches zero. The crux of my invention lies in means whereby I control the capacity of the motor in a manner which reflects the load conditions. The stator ring is urged toward its concentric position by means of a stator shifting plunger 40 slidable within a cylinder 41 formed in the motor case 21 diametrically opposed from the torque stem 38. The cylinder 41 is supplied with pressure fluid through a duct 42 which communicates through check valves 43 and 44 to either one of a pair of passages 45 contained in one end wall of the motor case. The passages 45 communicate with a supply duct 46 through check valves 47 and 48. The supply duct is connected to the control pump supply line 17. The passages 45 are also connected to a control pump 49 in this case a small gear pump comprising a driving gear 50 connected with the shaft 24 of the rotor 23 and a driven gear 51.

The arrangement of check valves and passages between the stator shifting plunger 40 and the control pump 49 is such that the output from the control pump 49, irrespective of which direction the rotor 23 turns is delivered to the cylinder 41. And the intake side of the control pump is connected to the supply line 17. The stator shifting plunger 40 is relatively loosely mounted in the cylinder 41 so that the clearance between the plunger 40 and its cylinder forms, in effect, a bypass allowing the discharge from the control pump 49 to flow into the motor chamber 22. The motor chamber 22 communicates with the drain line 15 through an opening 15a.

A stop 52 limits outward movement of the plunger 40 and thereby limits the maximum eccentricity of the stator ring 30.

A stop 53 limits movement of the stator ring 30 towards its concentric position. The stop 53 is located within the guide opening 39. The stop 53 includes a disk 54 and a piston 55 extending into a piston socket 56 provided in a plug 57 closing the outer end of the guide opening 39. A spring 58 is located between the disk 54 and the torque stem 38 to oppose the force of the stator shifting plunger 40. Another spring 59 bears between a shoulder provided within the guide opening 39 and the disk 54 so that both springs 58 and 59 oppose outward movement of the piston 55 with respect to its socket 56.

The piston socket 56 is connected by radial ducts 60 to an annular channel 61 which in turn communicates with a passage 62 provided in the motor case 21. The passage 62 connects with a cross bore 63 which in turn communicates with passages 64 controlled by check valves 65. The passages 64 connect to the motor lines 8 and the check valves 65 are so arranged that whichever line 8 and its passage 64 constitutes the intake or high pressure line this line will communicate with the piston socket 56 to exert a force on the piston 55. Small bleeder holes 66 are provided in the check valves 65 or, if desired, the clearance between the piston 55 and its socket may be such that fluid may bleed to a limited extent into the motor chamber 22 as in the case of the stator shifting plunger 40. Conversely a special bleeder passage may short circuit the plunger 40.

The shaft 25 is connected through a suitable gear drive 67 to drive wheels 68.

Operation of my automatic transmission is as follows: Assuming first that the vehicle is not in motion but the engine is running, the fluid from the pump 2 merely circulates through the unloader valve 11 and back to the reservoir. As the throttle pedal is depressed the unloader valve 11 is closed so that fluid is delivered through one set of motor lines 8 to the two motor units 9, through the valve block 32 and to the pistons 28 of the rotor, and returns through the other set of motor lines.

Figure 7:
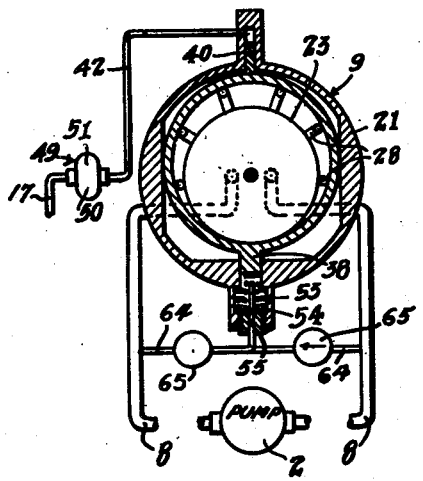
Figure 7 is a simplified diagram of my hydraulic transmission with the parts shown in the condition of rest, that is, with the pump inactive.
Figure 8:
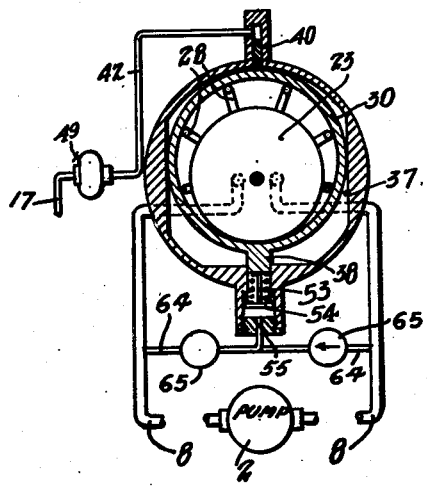
Figure 8 is a similar diagrammatical view, but showing the parts in the position assumed when the drive shaft is under maximum torque load and rotating at low speed.
Figure 9:
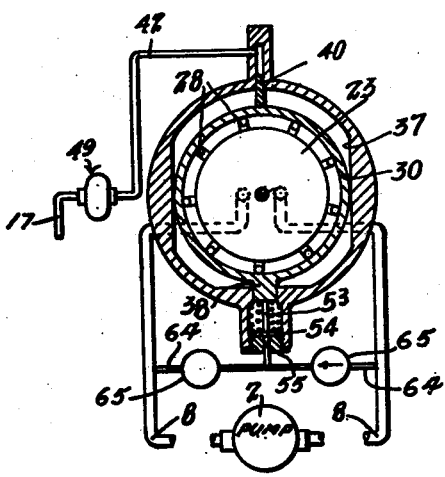
Figure 9 is a further diagrammatical view showing the parts in the positions assumed when the motor shaft is subjected to low torque load and is rotating at high speed.

It will be observed from Figures 2 and 3, as well as diagrammatical view Figure 7, that under these initial conditions the stator ring is in its most eccentric position. As the rotor 23 revolves, the control pump 49 is operated to supply fluid to the stator shifter plunger 40. The fluid pressure against the stator shifter plunger causes the plunger to urge the stator toward its concentric position in opposition to the spring 58. If the load resistance is high the main pump 2 builds up pressure sufficiently to move the piston 55 against the action of springs 58 and 59 so as to urge the stop 53 toward the stator ring 30 and limit movement of the stator toward its concentric position. This is the condition shown in the diagrammatical view Figure 8.

As the speed of the rotor 23 increases the capacity of the motor decreases by reason of the movement of the stator ring 30 toward its concentric position in response to the plunger 40. If at the same time the load on the output shaft 25 decreases, the piston 55 will return to its initial position moving the stop 53 away from the stator ring so that the capacity of the motor may be further reduced. The resulting effect is that at low or starting speeds, a high mechanical advantage between the shaft 25 and the prime mover or engine 1 is attained, and as the shaft speed increases the mechanical advantage decreases. Thus, a condition of high torque at low speed and low torque at high speed is attained.

It will be observed that the "gear ratios" between the prime mover and the drive wheel is, in effect, infinite within, of course, the limit of movement of the stator ring. If the output load increases, the effect is to reduce the shaft speed and effect an increase in mechanical advantage without materially affecting the engine speed. If it is desired to maintain the same shaft speed under the conditions of increased load it is merely necessary to increase the engine speed. Thus, complete control is accomplished merely by operation of the foot throttle.

The same conditions obtain whether the vehicle is driven in reverse or forward inasmuch as the reversing valve 6 merely changes the direction of rotation of the rotor, and the various check valves provided between the control pump 49 and its stator shaft plunger 40, as well as the check valves between the supply lines and the piston 55, insure flow of fluid in the desired direction.

Many other embodiments of the invention may be resorted to without departing from the spirit of the invention.

I claim:

1. An automatic fluid transmission, comprising: a variable capacity fluid motor adapted to be connected to a source of pressure fluid and having an output shaft, said motor being adjustable between a position of maximum capacity wherein said shaft is driven at low speed, and a position of low capacity wherein said shaft is driven at high speed; a control pump operatively connected with said output shaft to vary its output volume in proportion to the speed of said shaft; and means operatively connected with said control pump to urge said fluid motor toward its minimum capacity position as said motor speed and pump volume increases.

2. An automatic fluid transmission, comprising: a variable capacity fluid motor, adjustable between a minimum capacity position and a maximum capacity position; means responsive to the speed of rotation of said motor for urging said motor toward its minimum capacity position as the motor speed increases; yieldable means opposing said motor rotation responsive means for urging said motor toward its maximum capacity position; a stop for limiting movement of said motor toward its minimum capacity position; and fluid pressure responsive means for adjusting the position of said stop.

3. An automatic fluid transmission, comprising: a variable capacity fluid motor adapted to be connected to a source of pressure fluid and having an output shaft, said motor being adjustable between a position of maximum capacity wherein said shaft is driven at low speed, and a position of low capacity wherein said shaft is driven at high speed; a source of pressure fluid for driving said fluid motor; a control pump operatively connected with said output shaft to vary its output volume in proportion to the speed of said shaft; means operatively connected with said control pump to urge said fluid motor toward its minimum capacity position as said motor speed and pump volume increases; a means for limiting movement of said motor toward its position of minimum volume; and means responsive to the pressure of said pressure fluid to vary the position of said limiting means.

4. An automatic fluid transmission, comprising: a source of pressure fluid including a variable speed prime mover and a main pump driven thereby; a variable capacity fluid motor driven by the pressure fluid supplied by said main pump and having an output shaft, said motor being adjustable between a position of maximum fluid capacity wherein, for a selected rate of supply of pressure fluid, said shaft rotates at low speed, and a position of minimum capacity wherein, at said selected rate of pressure fluid supply, said shaft rotates at high speed; yieldable means urging said motor to its maximum capacity position; means driven by said output shaft to create a force proportional to the speed of said shaft; means responsive to said force for urging said motor toward its minimum capacity position in opposition to said yieldable means; a movable stop for limiting adjustment of said motor toward its minimum capacity position; and means responsive to said pressure fluid for moving said stop toward the maximum capacity position of said motor as the pressure of said pressure fluid rises.

5. An automatic fluid transmission, comprising: a source of pressure fluid including a variable speed prime mover and a main pump driven thereby; a variable capacity fluid motor driven by the pressure fluid supplied by said main pump and having an output shaft, said motor being adjustable between a position of maximum fluid capacity wherein, for a selected rate of supply of pressure fluid, said shaft rotates at low speed, and a position of minimum capacity wherein, at said selected rate of pressure fluid supply, said shaft rotates at high speed; a control pump; a piston subjected to the output of said pump; and a by-pass for said piston whereby the force exerted on said piston is in proportion to the volumetric output of said control pump, said fluid motor being operatively connected with said piston to move toward its minimum capacity position in proportion to the force exerted by said piston.

6. An automatic fluid transmission, comprising: a source of pressure fluid including a variable speed prime mover and a main pump driven thereby; a variable capacity fluid motor driven by the pressure fluid supplied by said main pump and having an output shaft, said motor being adjustable between a position of maximum fluid capacity wherein, for a selected rate of supply of pressure fluid, said shaft rotates at low speed, and a position of minimum capacity wherein, at said selected rate of pressure fluid supply, said shaft rotates at high speed; a control pump; a piston subjected to the output of said pump; a by-pass for said piston whereby the force exerted on said piston is in proportion to the volumetric output of said control pump, said fluid motor being operatively connected with said piston to move toward its minimum capacity position in proportion to the force exerted by said piston; a movable stop for limiting adjustment of said motor toward its minimum capacity position; and means responsive to said pressure fluid for moving said stop toward the maximum capacity position of said motor as the pressure of said pressure fluid rises.

LLOYD E. TOMLINSON.

REFERENCES CITED

The following references are of record in the file of this patent:

UNITED STATES PATENTS

| Number | Name | Date |
| --- | --- | --- |
| 1,904,496 | Maw | Apr. 18, 1933 |
| 2,099,630 | Schneider | Nov. 16, 1937 |
| 2,161,439 | Thoma | June 6, 1939 |
| 2,291,011 | Vickers | July 28, 1942 |
| 2,327,647 | Jandasek | Aug. 24, 1943 |
| 2,333,253 | Jandasek | Nov. 2, 1943 |
| 2,337,499 | Roth | Dec. 21, 1943 |

FOREIGN PATENTS

| Number | Country | Date |
| --- | --- | --- |
| 181,565 | Great Britain | June 22, 1922 |